United States Patent
Wolfson et al.

(10) Patent No.: US 11,675,913 B2
(45) Date of Patent: Jun. 13, 2023

(54) OPTIMIZING CONTAINER IMAGE ENCRYPTION

(71) Applicant: EMC IP Holding Company LLC, Hopkinton, MA (US)

(72) Inventors: Kfir Wolfson, Beer Sheva (IL); Jehuda Shemer, Kfar Saba (IL); Stav Sapir, Beer Sheva (IL); Amos Zamir, Beer Sheva (IL); Naor Radami, Shokeda (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 135 days.

(21) Appl. No.: 17/025,324

(22) Filed: Sep. 18, 2020

(65) Prior Publication Data

US 2022/0092192 A1 Mar. 24, 2022

(51) Int. Cl.
*G06F 21/60* (2013.01)
*G06F 21/62* (2013.01)
*G06F 9/455* (2018.01)

(52) U.S. Cl.
CPC ........ *G06F 21/602* (2013.01); *G06F 9/45545* (2013.01); *G06F 21/629* (2013.01); *G06F 21/6218* (2013.01)

(58) Field of Classification Search
CPC .............. G06F 21/602; G06F 9/45545; G06F 21/6218; G06F 21/629; G06F 9/455; G06F 2221/2107; G06F 8/63; G06F 21/12
See application file for complete search history.

(56) References Cited

U.S. PATENT DOCUMENTS

| | | | |
|---|---|---|---|
| 6,954,532 B1 | 10/2005 | Handley et al. |
| 8,738,681 B1 | 5/2014 | Burke et al. |
| 8,805,951 B1 | 8/2014 | Faibish et al. |
| 8,898,351 B2 | 11/2014 | Povaliaev et al. |
| 9,411,949 B2 | 8/2016 | Cho |
| 9,594,514 B1 | 3/2017 | Bono et al. |
| 9,697,241 B1 | 7/2017 | Mistry et al. |
| 9,703,965 B1 | 7/2017 | Robinson et al. |
| 9,930,115 B1 | 3/2018 | Wallner et al. |
| 9,983,909 B1 | 5/2018 | Tyde et al. |
| 10,032,032 B2 | 7/2018 | Suarfz et al. |

(Continued)

FOREIGN PATENT DOCUMENTS

WO     2019/149797 A1     8/2019

OTHER PUBLICATIONS

Extended European Search Report received for EP Patent Application No. 21194796.5, dated Jan. 31, 2022, 8 pages.

(Continued)

*Primary Examiner* — Meng Li
(74) *Attorney, Agent, or Firm* — Workman Nydegger (57) ABSTRACT

One example method includes packaging a containerized application into at least two images. The first image may include the main application and the second image includes a decryptor. Sensitive information associated with the application is encrypted and included in the second image. The decryptor operates separately from the main application. After the decryptor successfully completes, the main application is run. The main application may include a copier layer to copy any data decrypted by the decryptor into the main application.

18 Claims, 7 Drawing Sheets

(56) References Cited

U.S. PATENT DOCUMENTS

| | | |
|---|---|---|
| 10,044,640 B1 | 8/2018 | Levine et al. |
| 10,061,520 B1 | 8/2018 | Zhao et al. |
| 10,089,035 B1 | 10/2018 | Bono et al. |
| 10,089,037 B1 | 10/2018 | Bono et al. |
| 10,152,481 B1 | 12/2018 | Singh |
| 10,291,706 B1 | 5/2019 | Zhao et al. |
| 10,326,744 B1 | 6/2019 | Nossik et al. |
| 10,356,169 B1 | 7/2019 | Mistry et al. |
| 10,409,693 B1 | 9/2019 | Liang et al. |
| 10,419,931 B1 | 9/2019 | Sohail et al. |
| 10,437,622 B1 | 10/2019 | Chalmer et al. |
| 10,469,574 B1 | 11/2019 | Dai et al. |
| 10,534,671 B1 | 1/2020 | Zhao et al. |
| 10,659,329 B1 | 5/2020 | Zhao et al. |
| 10,659,533 B1 | 5/2020 | Zhao et al. |
| 10,691,613 B1 | 6/2020 | Tong et al. |
| 10,698,925 B1 | 6/2020 | Zhao et al. |
| 11,106,831 B2 | 8/2021 | Zhang et al. |
| 11,314,443 B2 | 4/2022 | Chen et al. |
| 11,455,405 B2 | 9/2022 | Wolfson et al. |
| 2013/0117019 A1 | 5/2013 | Akopian et al. |
| 2013/0173927 A1 | 7/2013 | Tian et al. |
| 2017/0134168 A1 | 5/2017 | Barnett et al. |
| 2017/0177877 A1 | 6/2017 | Suarez et al. |
| 2018/0124055 A1* | 5/2018 | Chen ............... H04L 63/0407 |
| 2018/0255075 A1 | 9/2018 | Brugger et al. |
| 2019/0171907 A1 | 6/2019 | Li et al. |
| 2019/0213319 A1* | 7/2019 | Gerebe ............... H04L 63/12 |
| 2019/0251278 A1 | 8/2019 | Kalinichenko et al. |
| 2019/0354389 A1* | 11/2019 | Du ............... G06F 9/45545 |
| 2020/0250319 A1* | 8/2020 | Bacher ............... G06F 16/116 |
| 2022/0012373 A1* | 1/2022 | Kulkarni ............... G06F 21/602 |
| 2022/0043916 A1 | 2/2022 | Wolfson et al. |

OTHER PUBLICATIONS

Giannakopoulos I. et al., "Isolation in Docker through Layer Encryption," Proceedings of the International Conference on Distributed Computing Systems, Jun. 2017, pp. 2529-2532.

* cited by examiner

OPTIMIZING CONTAINER IMAGE ENCRYPTION

FIELD OF THE INVENTION

Embodiments of the present invention generally relate to containerized applications, container security and container orchestration security. More particularly, at least some embodiments of the invention relate to systems, hardware, software, computer-readable media, and methods for a focused encryption and/or decryption of container images.

BACKGROUND

A container image, such as a Docker image, can be described in different ways. For example, an image may be described as a file that includes multiple layers or as a set of files. An image may also be described as an ordered collection of changes (e.g., layers) to a root filesystem. The image can be run in an engine, such as a Docker engine. Kubernetes, an example of a container orchestration platform, can be used to manage the deployment and scaling of containerized applications. Images can be deployed on any host with an appropriate engine and/or in an orchestration platform.

The image may be organized in logical layers that are defined in a file that may be referred to, in the case of the Docker container service, as a Dockerfile. The Dockerfile is typically a text document that contains the commands to be executed, in order, to build a docker image. The commands, when executed, build the image. The layers of an image may be readable to anyone who is able to access the image and this may constitute a threat to any sensitive data inside one of the layers within an image.

While the image could be encrypted to protect the sensitive data from being read when the container is at rest, such an approach may be problematic and inefficient. For example, the entire image may be encrypted and transported as a 'blob' to a deployment site. However, this approach introduces management and performance issues. For example, container startup time is impacted when an instance is instantiated, since the full encrypted image could be quite large. Another problem with the solution of encrypting the image, is that the deployment environment may have to be modified to support image decryption. Finally, performing the decryption may take a relatively long time, depending on the image size, and may also impact performance of other elements in environments that have heavy deployment scenarios.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings in which.

DETAILED DESCRIPTION OF SOME EXAMPLE EMBODIMENTS

Embodiments of the present invention generally relate to containerized applications and container security. More particularly, at least some embodiments of the invention relate to systems, hardware, software, computer-readable media, and methods for a focused encryption of container image(s) or portions thereof. Embodiments of the invention further relate to encrypting and/or decrypting container images or layers thereof while removing operating system (OS) runtime dependency for decryption. More specifically, embodiments of the invention remove the dependency of the decryptor on the operating system of the container.

Generally, embodiments of the invention improve the security of containers/images or the data contained therein by building related, but separate, images (or by dividing an image into related images). The first image may include layers that are not sensitive and may not need encryption. The first image may also contain a main application. A second image may include a decryptor layer along with an encrypted layer, which may include encrypted data or encrypted layers. During deployment or execution, the second image may be instantiated as a container and run first in order to decrypt the sensitive data. Running the first image after completion of the container that includes the decryptor allows the now decrypted layers to be incorporated into the runtime container of the main application. In one example, the decryptor and the sensitive layers, which are encrypted, are separated from the base image and the decryptor is run separately.

If the decryptor is inside a container image, the decryptor is part of the container runtime. If the decryptor is above the OS layers, then the decryptor runs in the context of the OS in that runtime instance. In addition, when the decryptor is inside a container image, layers that are loaded or executed prior to the decryptor may have malicious code that could be used to compromise the system or the security of the container.

Embodiments of the invention remove this dependency on the OS by moving the decryptor to a separate image and a separate runtime instance. When the decryptor is separated from the main image, the decryptor becomes a layer in its own image and OS dependency on the OS of the other image is removed. This eliminates the need to create different decryptors for different OS versions when the decryptor is simply included in the main image.

Also, by placing the decryptor in a separate image, bugs and security issues in the main application container do not enable access to the decryption keys. In other words, when the decryptor is included in the main application image, the application runs in the same memory as the decryptor. This may compromise instances of the application in a variety of ways.

Embodiments of the invention may integrate into and leverage orchestration platforms such as Kubernetes. By separating the decryptor from the application container, OS dependency is removed from the perspective of the decryptor. Further, the layers of the image can be selectively encrypted. In addition, the decryption keys are not provided through the main application container. Embodiments of the invention can also ensure that nothing in the main application runs before the decryptor to ensure that malicious code does not run before the decryptor.

In general, example embodiments of the invention embrace an image encryption process that may encrypt only the sensitive data (or layers) inside the image. The sensitive layers may be combined into a single layer that is then encrypted, and stored encrypted while at rest (e.g., in an image repository). Embodiments of the invention may also provide for adding a decryptor to an image that is separate from the main application image. The decryptor image is run before the main application image runs or is instantiated, so that the decryption process may take place at run-time and before the original application runs.

The encryption and decryption processes may be significantly shorter than if an entire image were to be encrypted and decrypted. There may be no need to make any changes in the deployment process or deployment environment, with the possible exception of some relatively minor configuration changes, and secret sharing. As well, example embodiments may provide for processes and mechanisms by way of which the layers of an image file to be protected may be readily selected and encrypted. In this way, it may be relatively easy to define and test the tradeoff between protection and runtime of an image.

In particular, one advantageous aspect of at least some embodiments of the invention is that, when encrypting a portion of an image, it may be relatively easy to define and test the tradeoff between protection and runtime of an image. An embodiment of the invention may secure the image data at rest, and so the image may be put in public domain or backup sites in a secure way. An embodiment of the invention may provide for selective encryption of an image in such a way that there is little or no impact on an associated deployment environment for the image. An embodiment of the invention may implement selective encryption of an image in such a way that the impact to startup time of a full working container is not materially affected. The selective encryption may be intra image or by encrypting sensitive data in a separate image.

The discussion herein may include references to images and containers in the context of Docker and Kubernetes. However, embodiments of the invention are not limited to these platforms and may be implemented in various container or image platforms and container orchestration platforms. More generally, embodiments of the invention may be employed in connection with any container definition and deployment environment, orchestration platform, and associated images, files, and components. The following discussion is not intended to limit the scope of the invention in any way. For example, embodiments of the invention may be adapted to the packaging and run-time methods of an orchestration platform such as Kubernetes.

In one example, embodiments of the invention are configured to increase or improve the security of container related processes including container or image formation, container deployment, layer encryption/decryption, container orchestration, or the like. Users are able to control which layers or portions of an image are encrypted. Embodiments of the invention may separate the decryptor (which could be a layer of the container image) into a separate image and run the decryptor image separately from the main container itself. In addition to providing a modular and efficient solution, this also improves security.

Figure 1:
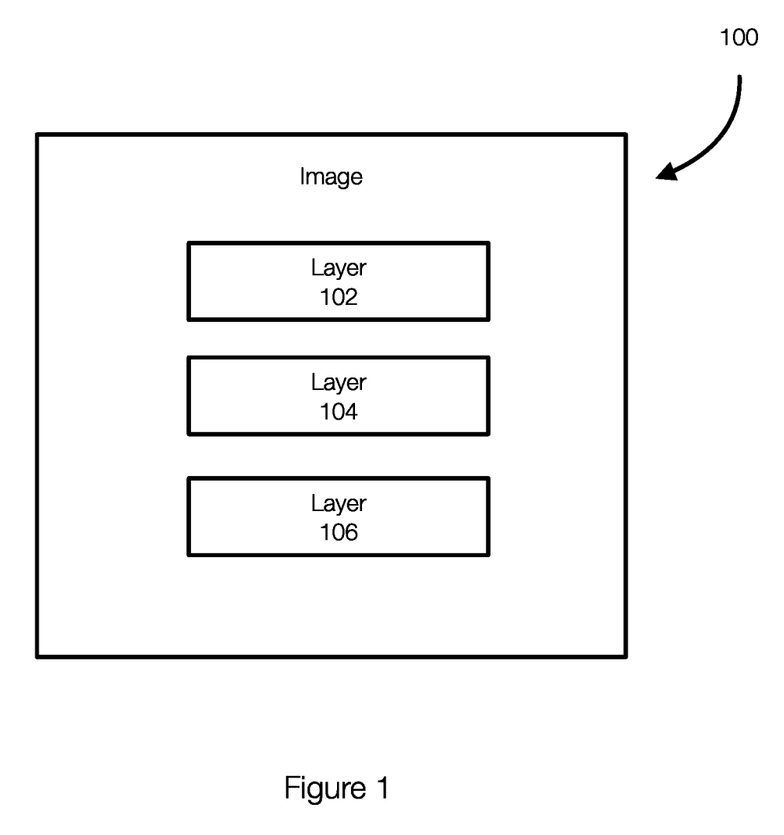
FIG. 1 discloses aspects of an example image.
Figure 2:
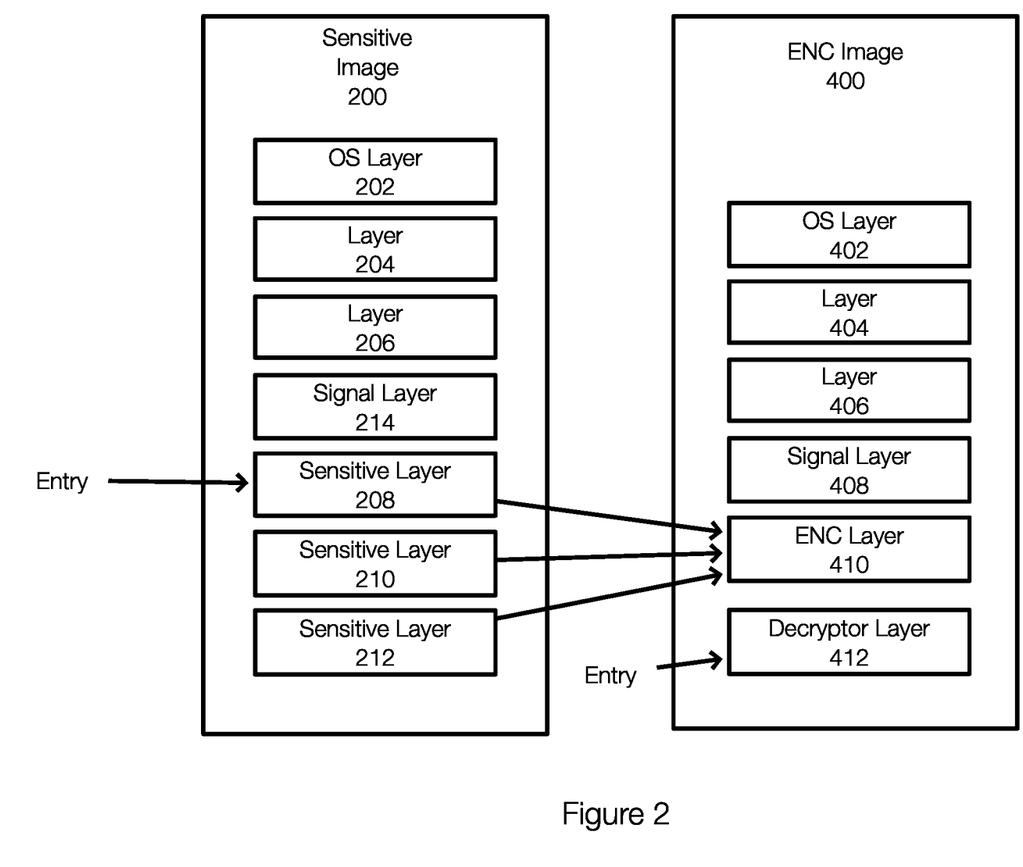
FIG. 2 discloses aspects of an example image that includes sensitive information, and an example encrypted image.
Figure 3:
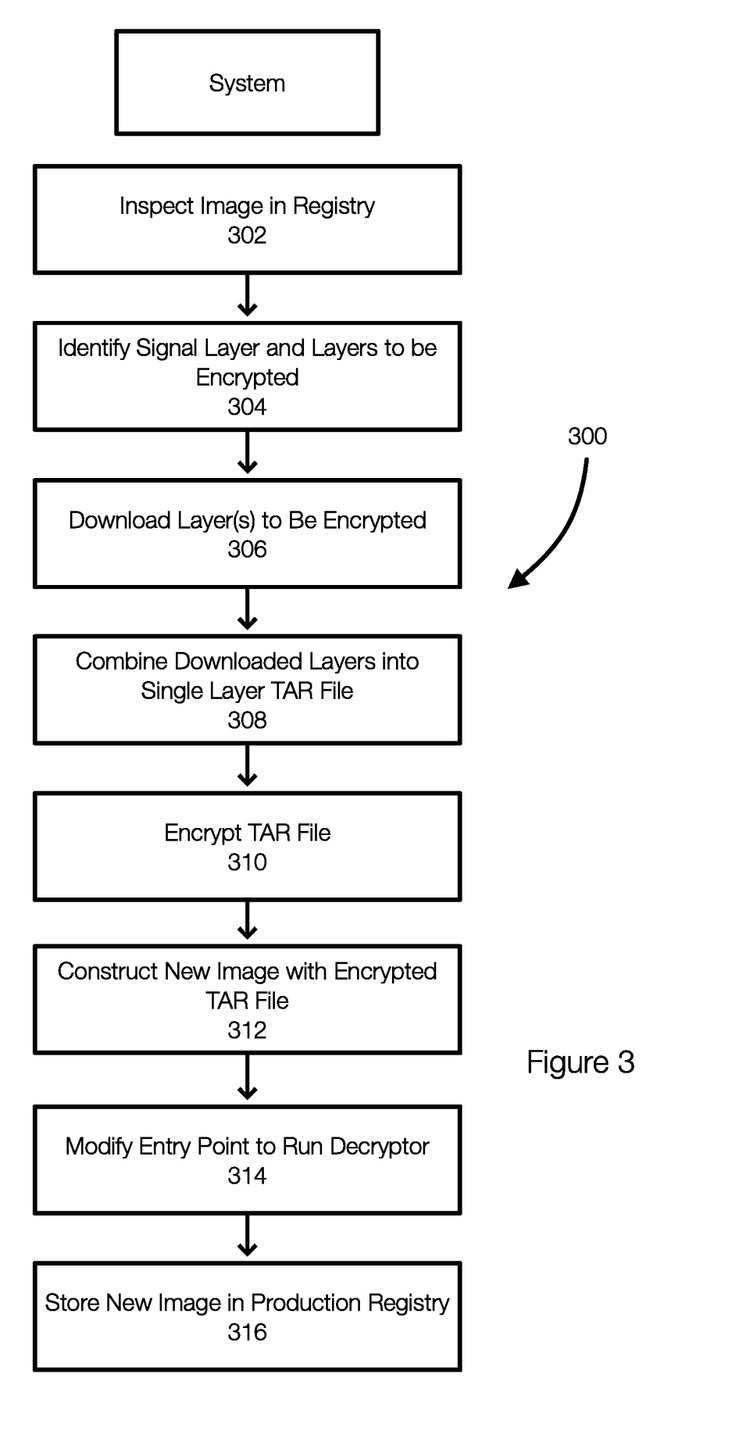
FIG. 3 discloses an example method for encrypting an image or a portion of an image.
Figure 4:
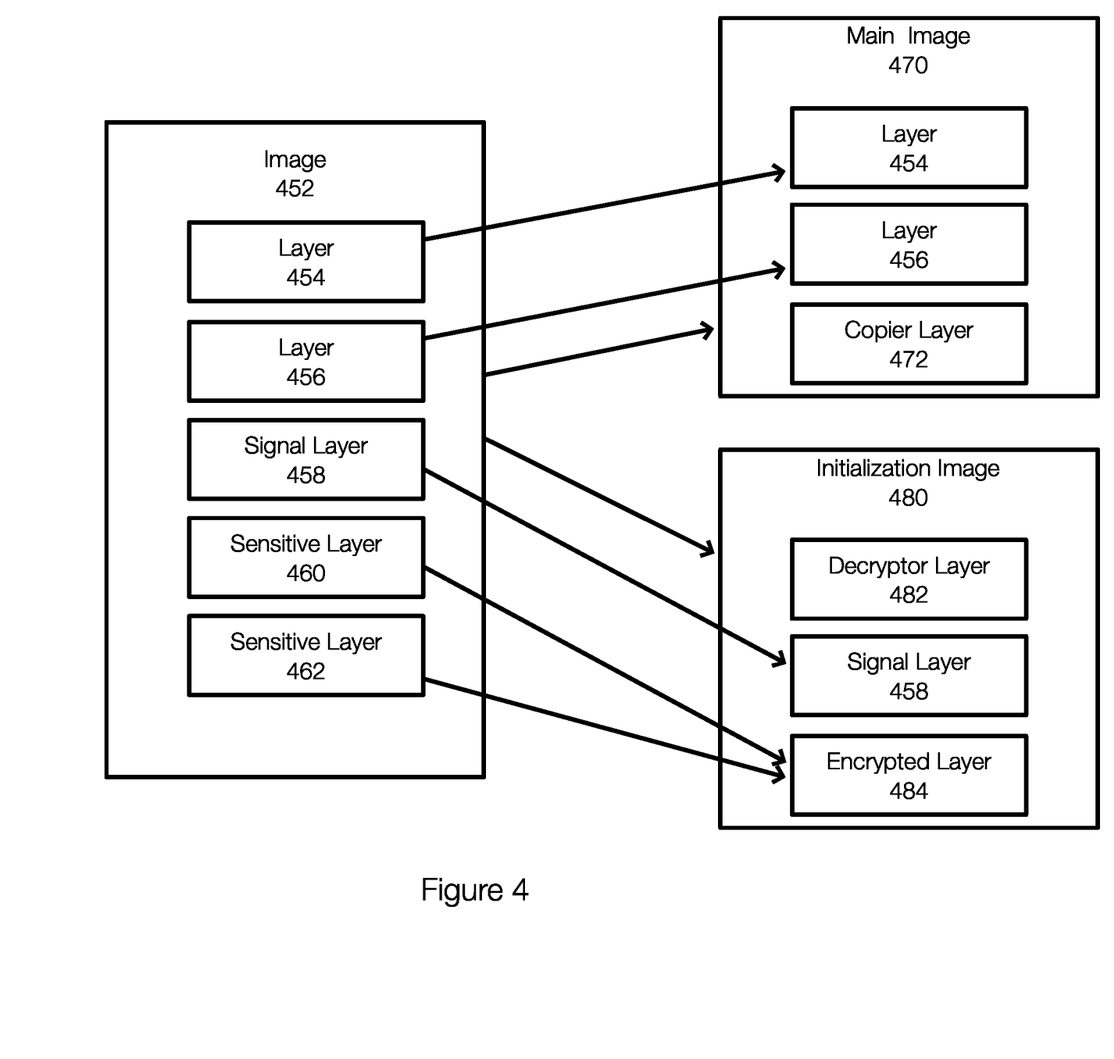
FIG. 4 discloses an example of related images where one image includes a main application and the other image includes a decryptor for sensitive layers.
Figure 5:
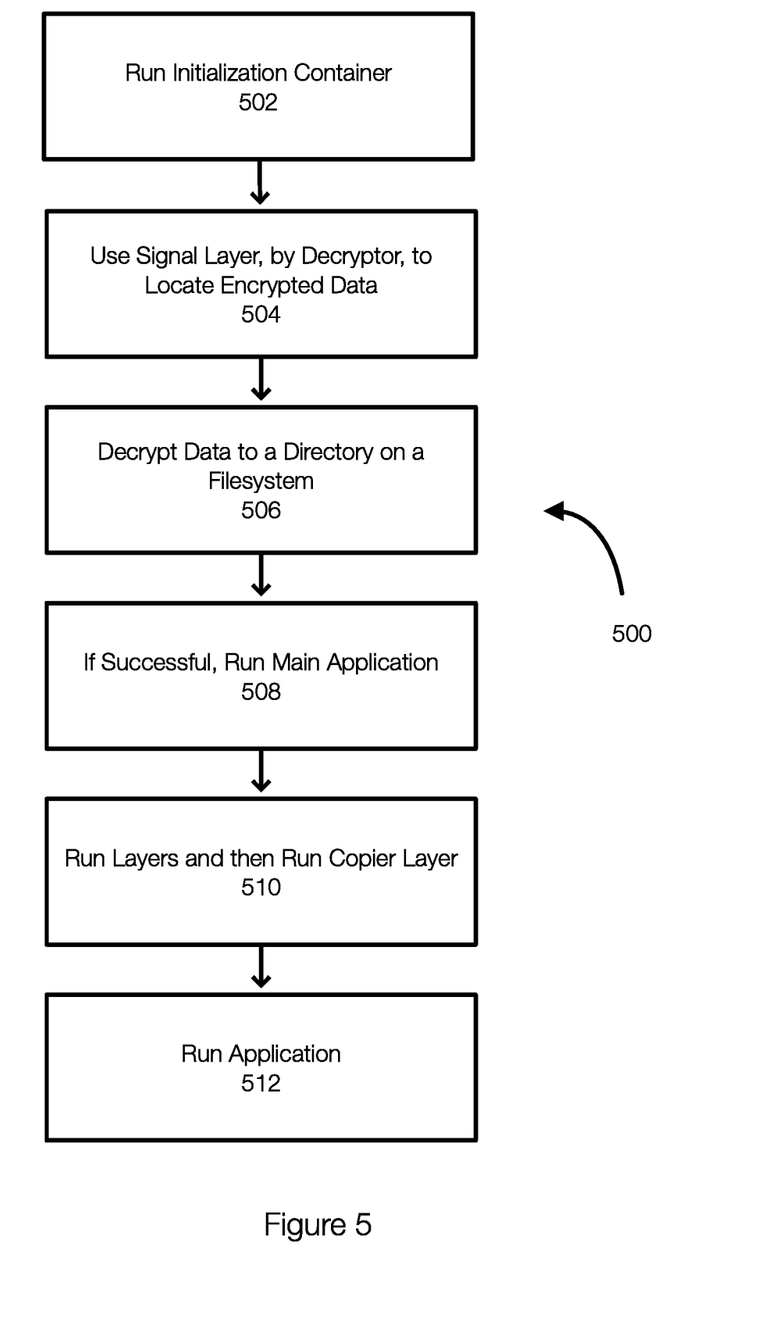
FIG. 5 discloses an example method for encrypting and/or running an image.

FIGS. 1-3 describe optimizing the encryption/decryption of images. In particular, FIGS. 1-3 discuss the process of encrypting certain layers of an image and the process of decrypting those layers at runtime. FIGS. 1-3 relate to embodiments for optimizing image encryption where the decryptor is included in the same image as the application. FIGS. 4-5 further illustrate examples of optimizing image encryption where the decryptor is separated from the main container image.

In general, and with reference to the example of FIG. 1, an image 100, such as a Docker image for example, may refer to a file or a combination of files/data grouped into layers such as layers 102, 104 and 106. A command file, such as a Dockerfile, may include commands that define the image 100 and that, when executed, build or assemble the layers in the image 100.

Generally, a command file describes the base image, as well as the additional layers the image will be composed of. More specifically, a command file may be a text file that contains commands used to assemble an image. Each command may result in a layer of the image. A command that does not modify the image file system may be considered as an empty layer, and the metadata of the commands may be kept in build history within an image configuration file. Each image may have an image configuration file that describes various parameters of the image itself such as, for example, the layers the image is composed of, and the identification of the entry point, for example. Identification of the entry point refers to the command to run after instantiation of the container.

Example embodiments may operate in connection with an image registry, an example of which is a Docker registry. In general, an image registry may comprise a repository that stores the layers that collectively form an image or that stores images. Such a registry may store the image configuration and layers as blobs in zipped fashion with plain text data inside. A registry may provide an application program interface (API) to pull and push images.

A registry may keep manifests of all images in the registry. A manifest may hold data about what image configuration to use, and the layers/commands that may be used to construct the image. For example, the Docker hub is a public domain docker registry that stores Docker images for public use. Many use cases and products may rely on this registry to hold their production images which can be used for deployment in AWS or Azure or any other platform.

In general, deployment refers to a process that instantiates an image such as to obtain a running process on an image engine, and to run a containerized application. Deployments may be implemented on any host with an appropriate engine or any other platform that supports and/or orchestrates images. A deployment environment may make a copy of the image from a registry and keep the copy of the image locally.

While images provide useful functionality, they are vulnerable to threats. For example, any data that is stored in a database (DB), Artifactory or local files is exposed to a risk of data theft, especially in public domains that can be breached. Additionally, there is a risk in private environments as well. Data can be stolen when the data is in a production environment or in some backup environments. Following is a more detailed discussion of some of the shortcomings of some images.

One characteristic of images that may make them vulnerable, such as to unauthorized access, is that images may include plain text files stored on disk. Thus, an attacker that can obtain the disk, breach the file system, or intercept the movement of an image from one location to the other, may obtain the data stored in the image.

As well, encryption and decryption processes such as may be employed with images may generally be relatively slow. This may be due to the use of algorithms that rely on complex mathematical functions. Data modification, such as IO operations, and mechanisms to protect against brute force may can be relatively slow on encryption/decryption process. Thus, decryption of a full image can be slow, and will slow the performance of the deployment system.

Further, container deployment environments may be performance sensitive. For example, deployment environments that use microservices architectures are constantly scaling or instantiating new containerized services. Anything that slows down these processes, such as image encryption and decryption, may adversely impact the system recovery and/or the system functionality. This, in turn, may result in a poor user experience and/or a slow system.

Moreover, conventional approaches to image security require modification of the deployment environment where the image is deployed. For example, encrypting the entire image, or encrypting each layer individually, requires support from the deployment environment. Such support is not present in most of the existing deployment environments and, even if present, may complicate and slow the deployment and operation processes. The process may be complicated further if the deployment environment does not have decryption capabilities, since the image may then have to be sent to a third party for decryption, which can result in delays to deployment of the container.

Finally, conventional approaches to image decryption may require support by the deployment environment, particularly, by an orchestrator before the image is sent to a target host for execution. Thus, the host which runs the application receives the image in an unencrypted form, which may make sensitive data in the image vulnerable to host access attacks.

The following observations may be pertinent to one or more example embodiments. First, decrypting a full image at an orchestrator or the host involves storing an unencrypted, and therefore vulnerable, image. As well, decryption of the full image may require modifications to the runtime environment. Further, the base image, which may comprise or consist of the OS (operating system), may not comprise sensitive data and, as such, there may be little value in encrypting the base image as a whole or as a layer. An image may comprise other layers as well for which encryption may not be necessary or useful, where such layers may include, but are not limited to, Apache Tomcat, Java, routers/proxies, databases, and/or, other application level services. Finally, the OS and base application services may collectively comprise a relatively large percentage of the overall size of a container image. As such, avoiding the encryption of the OS and related services may allow the container to run without requiring modifications to the deployment environment, and may significantly reduce the size of the encrypted portions of the image.

Thus, embodiments of the invention may provide a user with control over which image layers to encrypt, and may enable a user to build a mechanism to decrypt only those layers without requiring the support of the deployment environment. Accordingly, example embodiments comprise a new secured image, such as a Docker image for example, that has only the sensitive data encrypted. Thus, the relatively large base image or layer of unsensitive data may remain in plain text or original format, but data that is considered as sensitive may be kept encrypted. The decryption process may be implemented at runtime by a decryptor that is added, as a layer, to the image and that may decrypt the encrypted image data before executing the original application of which the container is a part.

In general, some example embodiments may involve marking the data or layers to be encrypted. In the context of an image, such marking may involve modifying, for example, the command file (e.g., the Dockerfile) of the image in order to mark the particular layer, or layers, of the image to be encrypted. For example, within a command file, just above the layer(s) that are to be marked for encryption, a command may be inserted to signal where encryption should begin. One example of such a command is:

RUN echo "========= START ENCRYPTION ========"

The inclusion of a command such as this may result in the creation of an empty layer that holds the command in the history of the layers within the image configuration file. A stop encryption signal may also be included in the command file.

Note that the invention is not limited to the particular example string noted above. Any sequence that signals where encryption should begin may be employed. It is also noted that while 'RUN echo' results in the creation of an empty layer, various other commands may be employed. Further, commands that create a layer that is not empty may alternatively be employed. In general then, any layer or may be implemented as one of a group of one or more signal layers. However, the use of a trivial empty layer, such as the one that may be created with the 'RUN echo' command, may be simple, and may function with no additional limitations.

During the image encryption process, the system may traverse the layers of the image or the commands in the command file until the signal layer, such as the command layer or command noted above, is located. The system may then know to encrypt at least one of the layers following the signal layer. This approach may thus enable the marking of any one or more image layers for encryption, and may help to optimize a tradeoff between data protection and runtime constraints.

With attention now to FIG. 2, details are provided concerning image configurations before, and after, encryption. As shown in FIG. 2, an image 200 may include a combination of layers. Some of the layers, such as the OS layer 202, and layers 204 and 206, may comprise data that is not sensitive, and may thus not require encryption. As such, those layers may be referred to as non-sensitive layers. No particular number, or type, of non-sensitive layers 202, 204, and 206, is required. The image 200 may be referred to as a sensitive image when it includes one or more layers that include sensitive information.

Note that in some embodiments, a non-sensitive layer may comprise some sensitive information, but the designation of that layer as non-sensitive may reflect a judgment that the potential risk of exposure of that sensitive information is outweighed by the cost of additional processing that would be required to protect that non-sensitive layer, and/or by other considerations. As well, a sensitive layer, discussed below, may include some non-sensitive information, but the designation of that layer as sensitive may reflect a judgment that, on the whole, it is desirable to encrypt that non-sensitive information since the encryption of that non-sensitive information may not impose any material processing burden on the system and such burden, in any case, may be outweighed by the need to protect the sensitive information in that sensitive layer.

The image 200 may additionally include one or more layers, such as the sensitive layers 208, 210, and 212, that include sensitive information that may require encryption. No particular number, or type, of sensitive layers 208, 210, and 212, is required. Whether or not particular data or information is sensitive may be defined by a user, administrator, or any other entity. Such an entity may be a human, or a computing system. In general, sensitive information embraces any information that is desired to be kept confidential, or at least subject to limited dissemination and/or availability, for whatever reason(s). In some instances, sensitive information may comprise user-specific, and/or system-specific information, that is not publicly available. Sensitive information may comprise proprietary financial and technical information of a business enterprise.

As also indicated in FIG. 2, the image 200 may include one or more signal layers 214. In general, the signal layer 214 may indicate to the system that any layer(s) following the signal layer 214 should be encrypted. In general, the signal layer 214 may serve as a notification to indicate the beginning of one or more layers that are to be considered as sensitive. Thus, in some embodiments, one, some, or all, of the layers preceding the signal layer may be non-sensitive, and one, some, or all, of the layers following the signal layer may be sensitive. The layers of the image may, in some embodiments, be considered as defining at least two points in time, namely, a point in time prior to the signal layer, and a point in time following the signal layer. As noted elsewhere herein, some other embodiments provide for an image with multiple signal layers and multiple groups of one or more non-sensitive layers and/or multiple groups of one or more sensitive layers. In some embodiments, the signal layer 214 may have an identifier that marks it as a signal layer so that the signal layer 214 can be understood by the system as the system traverses the layers of the image 200. While the illustrated example includes only one signal layer 214, it should be understood that there is no limit to the number of signal layers 214 that may be employed in an image. For example, in one alternative image configuration, an unencrypted image may have the following top-down configuration: LAYER; LAYER; LAYER; SIGNAL LAYER; SENSITIVE LAYER; SENSITIVE LAYER; STOP ENCRYPTION LAYER; LAYER; LAYER; SIGNAL LAYER; SENSITIVE LAYER; STOP ENCRYPTION LAYER. More generally, a sensitive, unencrypted image may have any number, and combination, of layers, signal layers, and stop encryption layers. Thus, the example image configurations disclosed herein are provided only by way of illustration and are not intended to limit the scope of the invention in any way.

With continued reference to FIG. 2, and directing attention now to FIG. 3 as well, an example method, generally denoted at 300, is disclosed for selective encryption of a container image. Execution of the method 300 may produce an encrypted docker image 400, as shown in FIG. 2 and discussed below.

The example method 300 may begin with inspection 302 of an image, which may have an image name, in a registry. The image may be located in the registry by searching for the image name. As a result of the inspection 302, one or more signal layers and/or one or more layers to be encrypted may be identified 304. The layer, or layers, to be encrypted may then be downloaded 306 or accessed. The layers may be encrypted prior to download.

The downloaded layers, if there are more than one, may then be combined together to create a single layer file, such as a .TAR file 308, for example. As used herein, a .TAR file refers to an archive that may be created by the Unix-based TAR utility. A TAR file is an archive created by TAR, a Unix-based utility that operates to package files together. The .TAR file may contain multiple files, which may be stored in an uncompressed format, and the .TAR file may also comprise metadata concerning the archive. The .TAR files may be compressed into .GZ files using GNU Zip compression. The scope of the invention is not limited to TAR files however, and any other suitable files and platforms for creating those files may alternatively be used. After the .TAR file has been created 308, it may then be encrypted 310 using any suitable encryption algorithm.

Next, a new image may be created 312 that includes the encrypted .TAR file. The new image may also include the non-sensitive data layer(s) of the original, unencrypted image, one or more signal layers, and a decryptor layer. The entry point of the original image may be modified 314 so that the decryptor layer of the new image runs first when the new image is instantiated. After the decryptor layer has run, the original entry point may then be called. After the entry point has been modified 314, the new image may then be stored in a production registry 316. At this point, the new image may be ready for use in a production environment.

Returning once more to FIG. 2, the image 400 is an example of a new image that may be created, such as by way of the example method 300. As the image 400 may include one or more encrypted layers, the image 400 may be referred to as being encrypted, although not all the layers of the image 400 may be encrypted.

In the example of FIG. 2, the image 400 includes non-sensitive layers such as OS layer 402, and layers 404, and 406, which may be copies or restorations of, respectively, OS layer 202, and layers 204, and 206, of the image 200. As well, the image 400 may include a signal layer 408 that may be a copy or restoration of the signal layer 214. The signal layer 408 may indicate to the system that the encrypted layer 410 should be decrypted by the decryptor layer 412. Because the decryptor layer 412 may be defined as the entry point, as shown in FIG. 2, the decryptor layer 412 may run first when the image 400 is instantiated. After the decryptor layer 412 has run, the original entry point, as shown in the image 200, may be called.

Thus, the image 400 that is generated, such as by the method 300, based on the original image 200 may comprise a self-contained decryptable image or decryptable layers. As such, the image 400 may not rely on any outside processes, entities, or services, to decrypt the sensitive information in the image 400, or to perform the other functions of the image 400. Rather, the image 400 performs its own decryption of its encrypted layer 410. Moreover, because the sensitive information may remain encrypted until runtime, the image 400 may provide assurance as to the security of that sensitive information.

Upon deployment, the system may use the new encrypted image 400 and provide the decryption key through standard secret handling. In Docker Swarm, for example, the system may use the secrets mechanism, or in Kubernetes use the ETCD and secrets mechanism.

With continued attention to the example encrypted image 400 of FIG. 2, further details are provided concerning a decryptor, such as the example decryptor layer 412. In some embodiments, the decryptor layer comprises a decryptor application in the form of a small Linux based executable that performs the decryption of the encrypted .TAR file to the container local file system. The decryptor may also open the .TAR file to restore the sensitive layers 208, 210 and 212 of the original image 200 to the image 400. Prior to exiting, the decryptor may transfer control to the original entry point, that is, the entry point given before the image was encrypted, and as shown in the example image 200. Operation of the decryptor layer 412 to decrypt the encrypted layer 410 and open the .TAR file may be performed automatically upon instantiation of the new image.

Because the decryptor may be part of image, no support is needed from the runtime environment. Rather, the decryptor may run as part of the standard container initialization and may therefore transparent to the runtime system and to the image layers themselves. It is noted that OSs other than Linux may be supported in a similar fashion in alternative embodiments.

As disclosed earlier, an image, such as the example image 400 for example, may comprise multiple separate encryption layers, such as the encryption layer 410. Such a configuration may be implemented by adding the following command:

RUN echo "========= STOP ENCRYPTION ========"

to identify layers that may be plain text. The signal layer 408 and stop-signal layer may be repeated multiple times in a given image 400. In at least some embodiments, there may be only one decryptor executable layer in the final image, regardless of how many encrypted layers may exist. This decryptor layer may decrypt all the encrypted layers prior to calling the original entry point. Care should be used using multiple layers, as in-between plain text layers may be a source for leakage of sensitive information. That said, if there are encrypted layers that are common to multiple containers, these encrypted layers may be shared in this way in their encrypted form, thus maintaining bandwidth efficiency during download despite the fact that the layers are encrypted.

While an OS layer of an image, such as the example image 200 for example, may not be encrypted in some embodiments, there may be a need in other embodiments to encrypt the OS layer. If there is a need to encrypt the OS layer and/or other non-sensitive layers, such as the layers 202, 204, and 206, for example, a boot loader layer may be added to the OS layer solely to run the decryptor. The boot loader layer may only need to have enough functionality to run the decryptor, and no more. This approach will still make encryption and decryption transparent to the deployment environment, but the runtime decryption may take longer as the OS, which is typically large in size, will also be decrypted prior to instantiation of the image. As well, if the OS layer and/or other non-sensitive layers are encrypted, the container environment variables that are used to pass runtime parameters to the application, may need to be transferred from the loader environment to the spun-off, decrypted OS.

As disclosed herein then, example embodiments embrace, among other things, encryption and decryption of images or portions thereof, such as Docker images for example. Such embodiments may use a command file and embedded decryptor to simplify management, and make the image portable to various different runtime environments. Example embodiments of the invention may include various attributes such as that they are relatively simple to use, may be instantiated efficiently at runtime, may avoid the need for changes or accommodation in the runtime environment, and may be transparent to the container, the runtime environment, and/or, to the administrator. Some particular embodiments may employ a signal layer as a marker to identify which layer(s) is/are to be encrypted. Some embodiments may embed a decryptor in an encrypted image which may run prior to an original entry point that was specified for the unencrypted image. Some embodiments may support multiple encryption layers. Finally, some embodiments may provide for encryption of an OS and/or other non-sensitive information.

In addition to containers as described with respect to FIGS. 1-3, embodiments of the invention further relate to encrypting and/or decrypting images or portions thereof in a manner that separates the decryptor from the main image or main container. Generally, embodiments of the invention use initialization containers (e.g., init containers in Kubernetes). An initialization container is a separately packaged container that is configured (and assured) to run before the application image or main image is run. If the initialization container fails, the application container is not run.

In some example, initialization containers are used for various purposes of attached device data. However, embodiments of the invention relate to initialization containers that are configured to manipulate other containers, including containers that are part of a pod. A pod, by way of example only, may include one or more containers or images. Thus, the application container and the initialization or decryption container may be included in the same pod. Because the initialization or decryption container is separate from the main or application container, it is possible to map devices and parameter only to the initialization container.

FIG. 4 illustrates an example of an image that has been divided into multiple images. In another example, FIG. 4 illustrates that when an image is packaged or created, two new images are created (or an existing image may be divided). One image includes the main application and the other image includes the decryptor. This allows the decryptor to be separated from the main image.

When creating the images, it may not be necessary to have a signal layer at least because the location of the encrypted layers can be predetermined in the image that includes the encrypted layers/files and the decryptor.

FIG. 4 may also correspond to a command file that, when executed, generates separate images. Alternatively, separate command files may be used to generate the various images discussed herein. The image 452 includes layer 454, layer 456, signal layer 458, sensitive layer 460 and sensitive layer 462. As illustrated in FIG. 4, the image 452 is packaged or divided into a main image 470 and an initialization image 480. Stated differently, the image 452 represents a conventional image. The main image 470 and initialization image 480 illustrate that the main application and the decryptor are packaged separately into different, but related images. The images shown in FIG. 4 may have the same format as previously described with respect to FIG. 2.

For discussion, FIG. 4 is discussed as if the image 452 is divided into separate images. As previously mentioned, however, embodiments of the invention may have two command files that are related: one to assemble or package a main image that includes the main application and one to assemble or package a decryptor image. This process would include signal layers such that the packaging process knows which layers to encrypt.

FIG. 4 illustrates that the image 452 is split into a main image 470 (which includes the main application for example) and an initialization (or decryptor) image 480. Non-sensitive layers 454 and 456 are placed in the main image 470 as the layers 454 and 456. A copier layer 472 is added to the main image 470.

The initialization image 480 contains a decryptor layer 482, the signal layer 458, and an encrypted layer 484. The encrypted layer 484 is generated by encrypting/combining or combining/encrypting the sensitive layers 460 and 462. The sensitive layers 460 can be encrypted separately however in one example. The signal layer 458 in the initialization image 480 allows the decryptor layer 482 to locate the encrypted layer 484 and perform decryption. However, the signal layer 458 could be removed and the encrypted layers 484 may be at a predefined location. In one example, the signal layer 458 is not required in the initialization image 480.

In this example, each image is constructed separately and a pod specification may be as follows:

```
apiVersion: v1
kind: Pod
metadata:
    name: myapp-pod
    labels:
        app: myapp
spec:
    containers:
    - name: myapp-container
        image: myapp_clean:1.1 (the main image 470)
    initContainers:
    - name: init-myapp
        image: myapp_init:1.1 (the initialization image 480)
```

In this example, the pod includes two containers and the initialization container or image 480 is defined in this pod specification. The pod specification ensures that the initialization container, which performs the decryption, can run and complete before the main container or image 470 is run.

Because the decryptor runs in a container that is separate from the main container, the decryptor is not dependent on the OS associated with the main application. This illustrates how the decryptor can be independent of the application OS.

In addition, because the initialization container can run with a different view of the filesystem or device than the main container or other containers in the same pod, decryption keys may be provided to the initialization container. The decryption keys are not accessible to the main application in the main container.

FIG. 5 illustrates an example of a container running sequence for a pod specification. When the sequence starts, the initialization container runs 502. As previously stated, the initialization container runs first and may run till completion. In one example, the main application container does not start or run unless the initialization container successfully completes.

Next, the decryptor finds the signal layer and uses the signal layer to locate 504 the encrypted layer or data. Alternatively, the decryptor may use a predetermined location at which the encrypted layer or data is stored.

Next, the decryptor decrypts 506 the encrypted layer or data to a directory on a filesystem (e.g., /mainappdecrypted). This may be in a base directory and, in one example, each layer of the image may have its own directory under the base directory.

If the initialization container runs and completes successfully, the main application container is run 508. The application layers are run normally until the copier layer is reached. The copier layer is run 510. The copier layer may copy the unencrypted layers on the filesystem (e.g., from /mainappdecrypted) into their place in the layer root directory. The main application then runs 512.

By placing the decryptor in a separate image or container, the decryption is transparent to the main application or the main image. This makes the scheme both modular and more secure.

In some examples, there may be multiple signal and stop-signal layers in an image. In some example, a signal layer may not be required. A predetermined location may be used. In one example, a copier layer is provided for each set of signal and stop-signal layers. At runtime, each encrypted data layer is opened into a separate directory. The corresponding copier layer then copies from a designated layer or directory.

Embodiments of the invention also accommodate additional initialization layers. In one example, the decryptor image is configured to run first and may be the first initialization image in the pod specification. If any initialization layers are placed before the decryptor image, these initialization layers should not contain any encrypted layers in one example. Further, these layers may pose a security risk as they may attempt to manipulate inputs to the decryptor image.

Figure 6:
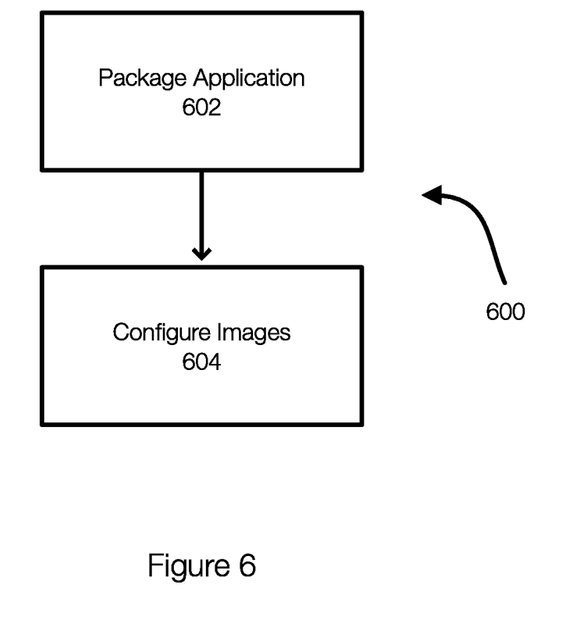
FIG. 6 illustrates an example of packaging an application.

FIG. 6 illustrates an example of a method for preparing a pod or a package. The method 600 includes packaging 602 an application. Packaging an application may include, for example, dividing an image into at least two different images. This may require the initial image to be processed to evaluate the layers in order to identify which layers are deemed to have sensitive information that may be encrypted. Alternatively, the application can be packaged as two images. In either example in one embodiment, the package includes at least two images. One image includes the main application and the other image includes a decryptor and encrypted sensitive data layers or other encrypted data. The image with the decryptor executes first. An optional signal layer or a predefined location may be used to identify the location of the encrypted sensitive data. After the decryptor image successfully completes, the other image may execute. This image includes a copier layer that allows the decrypted data to be copied into the main container instance.

When packaging the application, the images are configured 604 such that the decryptor image executes first.

Following are some further example embodiments of the invention. These are presented only by way of example and are not intended to limit the scope of the invention in any way.

Embodiment 1. A method, comprising: packaging an application that is associated with sensitive data into at least a first image and a second image by placing first layers in the first image, the first layers including a copier layer and by placing second layers in the second image, wherein the second layers include a decryptor layer and an encrypted layer that includes the sensitive data in an encrypted form; and configuring the second image to run before the first image.

Embodiment 2. The method of embodiment 1, further comprising running the second image as an initialization container, wherein execution of the initialization container includes decrypting, by the decryptor, the encrypted layer to obtain decrypted sensitive data.

Embodiment 3. The method of embodiment 1 and/or 2, further comprising storing the decrypted sensitive data in a directory of a filesystem.

Embodiment 4. The method of embodiment 1, 2, and/or 3, further comprising running the first image as a main container after the initialization container successfully completes.

Embodiment 5. The method of embodiment 1, 2, 3, and/or 4, further comprising running the copier layer, wherein the copier layer copies the decrypted sensitive data in the directory to a location in a layer root directory associated with the main application.

Embodiment 6. The method of embodiment 1, 2, 3, 4, and/or 5, further comprising generating a pod specification such that the second image runs and completes before the first image is run.

Embodiment 7. The method of embodiment 1, 2, 3, 4, 5, and/or 6, further comprising generating the encrypted layer by encrypting one or more sensitive layers of the sensitive data.

Embodiment 8. The method of embodiment 1, 2, 3, 4, 5, 6, and/or 7, wherein packaging the application includes dividing an image into the first image and the second image or constructing a command file for the first image and a command file for the second image.

Embodiment 9. The method of embodiment 1, 2, 3, 4, 5, 6, 7, and/or 8, further comprising placing the decryptor layer in the second image such that the decryptor layer in the second image is not dependent on an operating system included in the first image.

Embodiment 10. The method of embodiment 1, 2, 3, 4, 5, 6, 7, 8, and/or 9, the second image including a signal layer and a stop-signal layer that identify a location of the encrypted layer in the second image.

Embodiment 11. A method for performing any of the operations, methods, or processes, or any portion of any of these including any portions of any of embodiments 1-109, disclosed herein.

Embodiment 12. A non-transitory storage medium having stored therein instructions that are executable by one or more hardware processors to perform the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 4.

Figure 7:
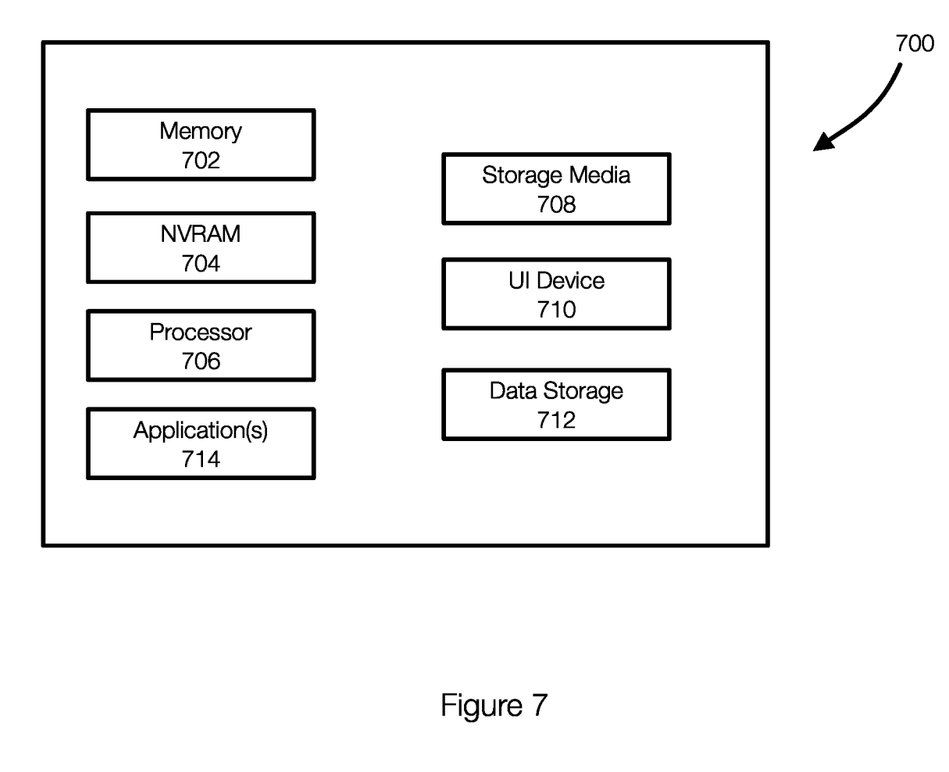
FIG. 7 discloses aspects on an example computing system or environment.

In the example of FIG. 7, the physical computing device 600 includes a memory 702 which may include one, some, or all, of random access memory (RAM), non-volatile random access memory (NVRAM) 704, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, the creation, modification, encryption, and/or decryption, of one or more container images. More generally, the scope of the invention embraces any operating environment in which the disclosed concepts may be useful.

Embodiments of the invention may be employed in connection with container-based platforms such as Docker, although no particular platform is required to be employed in any embodiment. Container-based platforms may involve or include deployment environments such as cloud computing environments. Example cloud computing environments with which example embodiments of the invention may be employed include, but are not limited to, DellEMC Cloud, Microsoft Azure, Amazon AWS, and Google Cloud. More generally however, the scope of the invention is not limited to employment of any particular type or implementation of cloud computing environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    packaging an application that is associated with sensitive data into at least a first image and a second image by placing first layers in the first image, the first layers including a copier layer configured to perform copying and by placing second layers in the second image, wherein the second layers include a decryptor layer configured to perform decryption and an encrypted layer that includes the sensitive data in an encrypted form;
    configuring the second image to run before the first image;
    running the second image as an initialization container and running the first image as a main container after the initialization container, wherein execution of the initialization container includes decrypting, by the decryptor, the encrypted layer to obtain decrypted sensitive data; and
    running the copier layer, wherein the copier layer copies the decrypted sensitive data.

2. The method of claim 1, further comprising storing the decrypted sensitive data in a directory of a filesystem.

3. The method of claim 2, further comprising running the first image as the main container after the initialization container successfully completes.

4. The method of claim 3, further comprising running the copier layer, wherein the copier layer copies the decrypted sensitive data in the directory to a location in a layer root directory associated with the main container, which includes a main application.

5. The method of claim 1, further comprising generating a pod specification such that the second image runs and completes before the first image is run.

6. The method of claim 1, further comprising generating the encrypted layer by encrypting one or more sensitive layers of the sensitive data.

7. The method of claim 1, wherein packaging the application includes dividing an image into the first image and the second image or constructing a command file for the first image and a command file for the second image.

8. The method of claim 7, further comprising placing the decryptor layer in the second image such that the decryptor layer in the second image is not dependent on an operating system included in the first image.

9. The method of claim 1, further comprising creating the first image and the second image.

10. A non-transitory storage medium having stored therein instructions that are executable by one or more hardware processors to perform operations comprising:
    packaging an application that is associated with sensitive data into at least a first image and a second image by placing first layers in the first image, the first layers including a copier layer configured to perform copying and by placing second layers in the second image, wherein the second layers include a decryptor layer configured to perform decryption and an encrypted layer that includes the sensitive data in an encrypted form;
    configuring the second image to run before the first image;
    running the second image as an initialization container and running the first image as a main container after the initialization container, wherein execution of the initialization container includes decrypting, by the decryptor, the encrypted layer to obtain decrypted sensitive data; and running the copier layer, wherein the copier layer copies the decrypted sensitive data.

11. The non-transitory storage medium of claim 10, further comprising storing the decrypted sensitive data in a directory of a filesystem.

12. The non-transitory storage medium of claim 11, further comprising running the first image as the main container after the initialization container successfully completes.

13. The non-transitory storage medium of claim 12, further comprising running the copier layer, wherein the copier layer copies the decrypted sensitive data to a location in a layer root directory associated with the main container, which includes a main application.

14. The non-transitory storage medium of claim 10, further comprising generating a pod specification such that the second image runs and completes before the first image is run.

15. The non-transitory storage medium of claim 10, further comprising generating the encrypted layer by encrypting one or more sensitive layers of the sensitive data.

16. The non-transitory storage medium of claim 10, wherein packaging the application includes dividing an image into the first image and the second image or constructing a command file for the first image and a command file for the second image.

17. The non-transitory storage medium of claim 16, further comprising placing the decryptor layer in the second image such that the decryptor layer in the second image is not dependent on an operating system included in the first image.

18. The non-transitory storage medium of claim 10, the second image including a signal layer and a stop-signal layer that identify a location of the encrypted layer in the second image.

\* \* \* \* \*